United States Patent [19]
Meunier et al.

[11] Patent Number: 5,833,729
[45] Date of Patent: Nov. 10, 1998

[54] METHOD AND APPARATUS FOR BENDING GLASS SHEETS

[75] Inventors: Olivier Meunier, Sedan; Philippe Scandella, Poix-Terron, both of France; Michael T. Fecik, Pittsburgh, Pa.; Robert G. Frank, Sarver, Pa.; William B. Zimmerman, Pittsburgh, Pa.

[73] Assignee: PPG Industries, Inc., Pittsburgh, Pa.

[21] Appl. No.: 766,952

[22] Filed: Dec. 16, 1996

[51] Int. Cl.⁶ .................................................. C03B 23/023
[52] U.S. Cl. .............................. 65/106; 65/104; 65/268; 65/273; 65/289
[58] Field of Search .............................. 65/106, 104, 268, 65/273, 287, 289

[56] References Cited

U.S. PATENT DOCUMENTS

| | | | |
|---|---|---|---|
| 3,527,589 | 9/1970 | Ritter, Jr. ..................................... | 65/289 |
| 3,960,535 | 6/1976 | Hamilton et al. .......................... | 65/106 |
| 4,204,854 | 5/1980 | McMaster et al. ........................ | 65/106 |
| 4,272,274 | 6/1981 | Frank et al. ............................... | 65/273 |
| 4,311,509 | 1/1982 | Reader et al. .............................. | 65/351 |
| 4,381,933 | 5/1983 | Schultz et al. ............................. | 65/106 |
| 4,496,386 | 1/1985 | Hymore et al. ............................ | 65/106 |
| 4,579,573 | 4/1986 | Fecik et al. ................................ | 65/106 |
| 4,662,925 | 5/1987 | Thimons et al. ........................... | 65/104 |
| 4,746,348 | 5/1988 | Frank ......................................... | 65/104 |
| 4,767,434 | 8/1988 | Schwartz et al. ........................... | 65/29 |
| 4,830,650 | 5/1989 | Kelly ......................................... | 65/106 |
| 5,004,491 | 4/1991 | McMaster et al. ........................ | 65/106 |
| 5,006,146 | 4/1991 | Mathivat et al. .......................... | 65/106 |
| 5,026,414 | 6/1991 | Mathivat et al. .......................... | 65/106 |
| 5,286,271 | 2/1994 | Rueter et al. .............................. | 65/106 |
| 5,403,369 | 4/1995 | McMaster ................................. | 65/106 |

*Primary Examiner*—Steven P. Griffin
*Attorney, Agent, or Firm*—Andrew C. Siminerio

[57] ABSTRACT

The present invention provides an arrangement for shaping multiple sheets of heat softenable material which includes a shaping station and a conveying system to deliver a plurality of heat softened sheets into the shaping station. The shaping station includes an upper vacuum mold having a plurality of downwardly facing sheet shaping surfaces each generally conforming to a desired shape of a sheet to be shaped and a plurality of stops positioned below the upper mold such that each of the sheets is aligned below a corresponding one of the upper mold sheet shaping surfaces when the sheet contacts selected stops. Lower molds are positioned below the upper mold sheet shaping surfaces to lift and press the aligned sheets against the upper mold sheet shaping surfaces to shape the sheets. A vacuum is drawn along the upper mold sheet shaping surfaces to secure the sheets to the upper mold and shape the sheets. The upper mold and shaped sheets are moved to a transfer station having a conveying surface generally corresponding to the desired shape of the sheets and the vacuum in the upper mold is released to deposit the shaped sheets from the upper mold onto the conveying surface. The stops are selectively movable within the shaping station to allow the sheets to be conveyed into the shaping station either in a side-by-side or serially aligned orientation and positioned below the upper vacuum mold.

28 Claims, 5 Drawing Sheets

FIG. 5 ic considerations and field of invention...

METHOD AND APPARATUS FOR BENDING GLASS SHEETS

BACKGROUND OF THE INVENTION

1. Field of Invention

This invention relates to bending heat softenable sheet material and, in particular, to bending two or more individual glass sheets at one time using a combination of a lifting ring, a vacuum mold, and shaped conveyor rolls.

2. Technical Considerations

Shaped and tempered glass sheets are widely used as side windows or rear windows in vehicles such as automobiles or the like. To be suitable for such applications, flat glass sheets must be shaped to precisely defined curvatures dictated by the shape and outline of the frames defining the window openings into which the glass side or rear windows are installed. It is also important that the side or rear windows meet stringent optical and strength requirements and that the windows be free of optical defects and reflective distortion that would tend to interfere with the clear viewing through their viewing area.

The commercial production of shaped glass sheets for such purposes commonly includes heating flat sheets to the softening point of the glass, shaping the heated glass to a desired curvature and cooling the bent sheets in a controlled manner to a temperature below the annealing range of the glass. During such processing, a glass sheet is generally conveyed along a substantially horizontal path through a tunnel-type furnace, heated to its heat softening temperature and transferred into a shaping station adjacent the furnace, where the glass sheet is shaped. After shaping, the glass sheet is transferred to a cooling station where it is controllably cooled. The heat softened glass sheet may be shaped, for example, by conveying the sheet over a series of transversely curved conveyor rolls as disclosed in U.S. Pat. No. 4,381,933 or by pressing the sheet between a pair of upper and lower shaping surfaces. In this later process, the upper surface may be a full surface vacuum mold and the lower surface may be a full surface press as disclosed in U.S. Pat. No. 4,662,925, a segmented mold as disclosed in U.S. Pat. No. 4,272,274 or a ring-type mold as disclosed in U.S. Pat. No. 4,830,650. In U.S. Pat. No. 5,286,271, the upper vacuum mold moves to transfer and deposit a shaped sheet onto a series of curved conveyor rolls for transport into a cooling station.

It would be beneficial to use these glass sheet shaping techniques to process multiple glass sheets so as to increase production and reduce overall costs.

SUMMARY OF THE INVENTION

The present invention provides an arrangement for shaping multiple sheets of heat softenable material which includes a shaping station and a conveying system to deliver a plurality of heat softened sheets into the shaping station. The shaping station includes an upper vacuum mold having a plurality of downwardly facing sheet shaping surfaces each generally conforming to a desired shape of a sheet to be shaped and a plurality of stops positioned below the upper mold such that each of the sheets is aligned below a corresponding one of the upper mold sheet shaping surfaces when the sheet contacts selected stops. Lower molds are positioned below the upper mold sheet shaping surfaces to lift and press the aligned sheets against the upper mold sheet shaping surfaces to shape the sheets. A vacuum is drawn along the upper mold sheet shaping surfaces to secure the sheets to the upper mold and shape the sheets. The upper mold and shaped sheets are moved to a transfer station having a conveying surface generally corresponding to the desired shape of the sheets and the vacuum in the upper mold is released to deposit the shaped sheets from the upper mold onto the conveying surface. In one particular embodiment of the invention, the upper vacuum mold and shaped sheets are moved to the transfer station at a speed which is generally the same as the speed at which the sheets advance along the transfer station conveying surface. The vacuum is released and the shaped sheets are deposited onto the conveying surface while the upper mold and sheets are moving from the shaping station to the transfer station to impart movement in the sheets along the conveying surface as they contact the conveying surface and minimize any change in the sheets' speed when the shaped sheets are deposited onto the conveying surface. The stops are selectively movable within the shaping station to allow the sheets to be conveyed into the shaping station either in a side-by-side or serially aligned orientation and positioned below the sheet shaping surface of the upper vacuum mold.

DETAILED DESCRIPTION OF THE INVENTION

In the present invention, multiple heat softenable sheets are heated, shaped, and heat strengthened. Unlike shaping operations wherein the sheets overlay each other, e.g. when shaping glass doublet for an automotive windshield by gravity sag bending, the sheets to be shaped in the present invention remain apart but closely spaced during the shaping operation. The apparatus in the present invention for shaping and treating heat softenable materials, such as glass but also including plastic and sheet materials, is similar to that disclosed in U.S. Pat. No. 5,286,271. As presented herein, the apparatus is configured to shape two glass sheets at a time but it should be apparent that additional sheets may be shaped using the teachings of the present invention.

Figure 1:
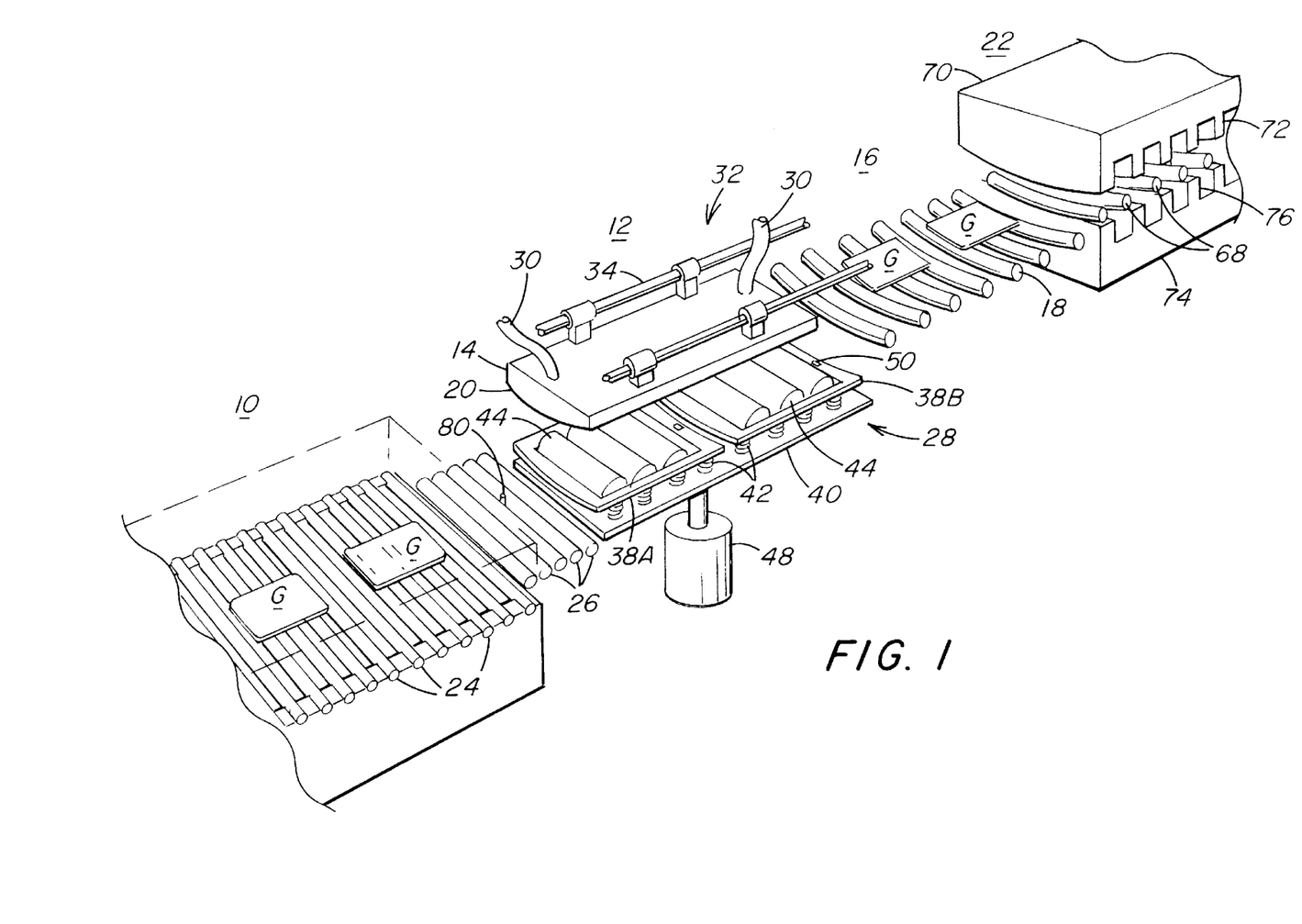
FIG. 1 is a perspective view of one embodiment of the present invention, with portions removed for clarity.
Figure 2:
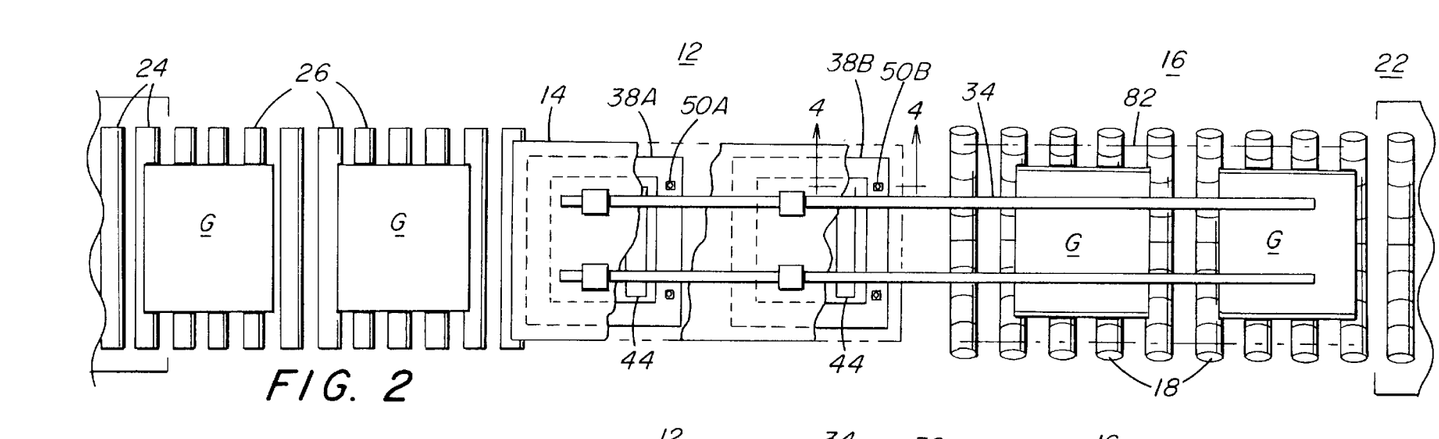
FIG. 2 is a schematic plan view of the embodiment of the invention illustrated in FIG. 1.
Figure 3:
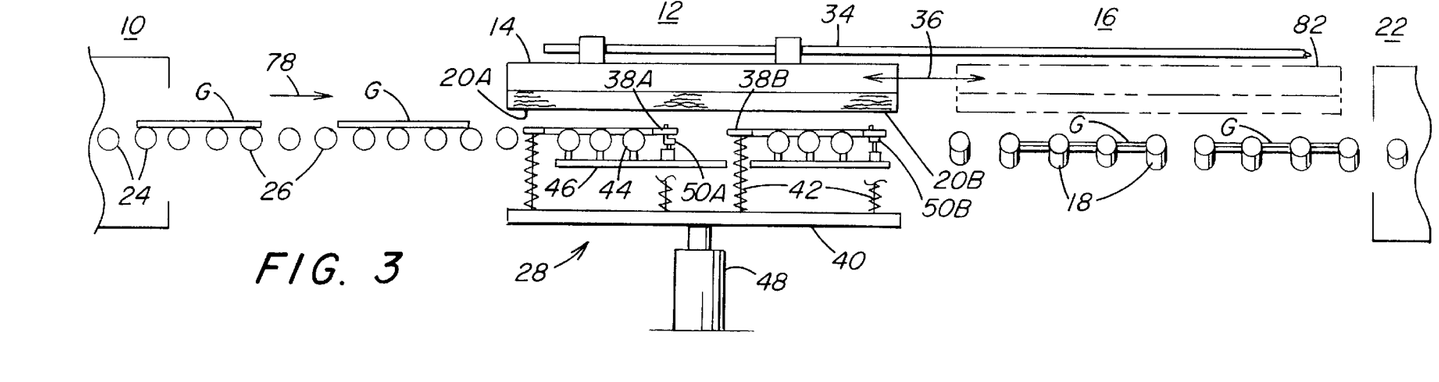
FIG. 3 is a schematic side elevational view of the embodiment of the invention illustrated in FIG. 1.

Referring to FIGS. 1–3, the apparatus includes a tunnel-type furnace through which pairs of glass sheets G are conveyed from a loading station (not shown) at the upstream end of the furnace 10 along a generally horizontal path to a shaping station 12, where the glass sheets G are pressed against an upper vacuum mold 14. The mold 14 holds a pair of glass sheets G by vacuum, as will be discussed later in more detail, and shuttles along a path to a position which is a short vertical distance above a downstream transfer station 16. Station 16 includes a series of transversely shaped conveyor rolls 18 having a transverse elevational curvature that generally corresponds to the transverse curvature of a downwardly facing shaping surface 20 of upper vacuum mold 14. The shaped glass sheets G are deposited onto rolls 18 which in turn maintains the glass sheets' shape as they are conveyed to a cooling station 22 which controllably cools the glass sheet G.

Figure 5:
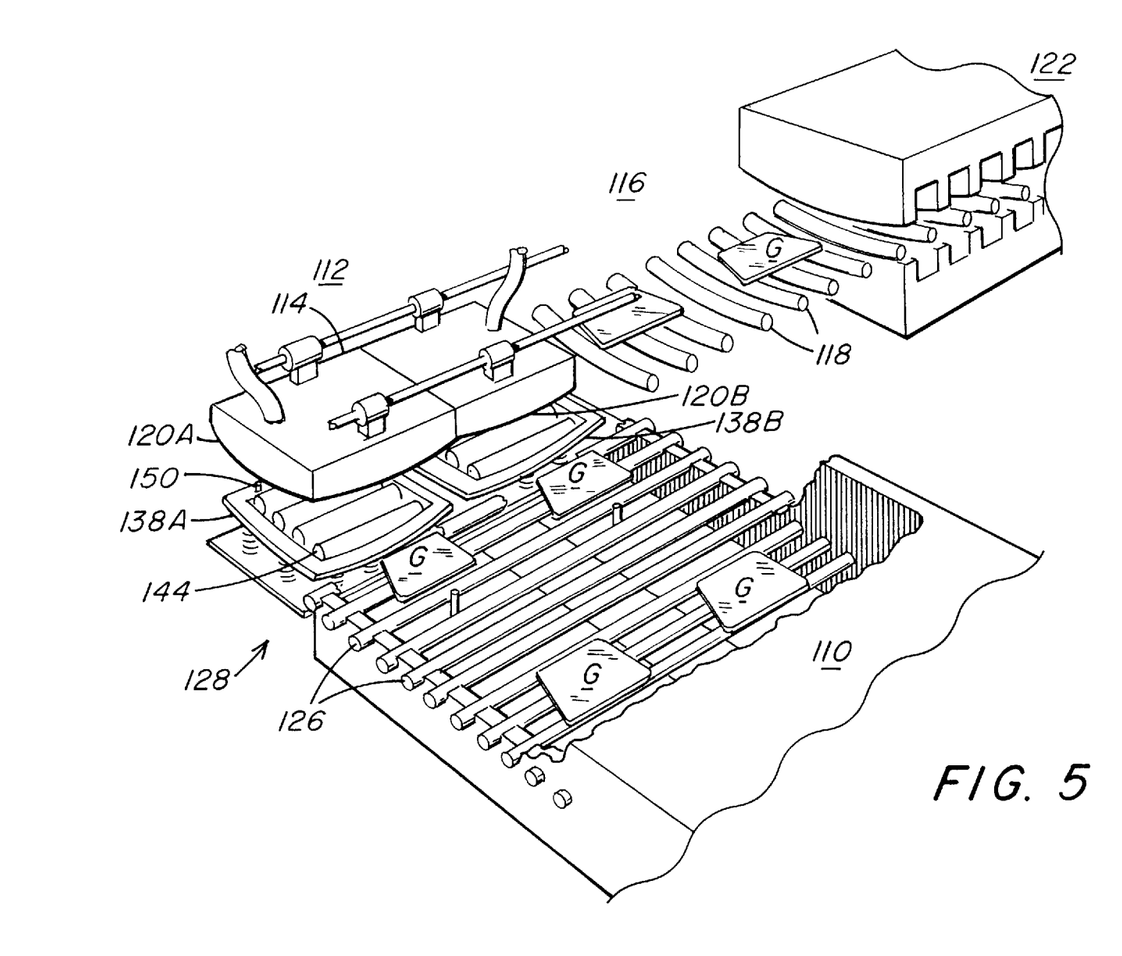
FIG. 5 is a perspective view of an alternate embodiment of the present invention, with portions removed for clarity.

The overall dimensions of the furnace 10, shaping station 12, and transfer station 16 depend on the relative position of the sheets as they are heated and shaped. More specifically, in the embodiment of the invention illustrated in FIGS. 1–3, the pairs of sheets are conveyed into furnace 10 aligned along a common centerline of the sheets G so that the shaping station 12 and mold 14 must be long enough to accommodate the simultaneous shaping of both sheets and the transfer station 16 must be long enough to receive both sheets G, as will be discussed later in more detail. In FIG. 5, the glass sheets are positioned side-by-side as they are conveyed through the furnace 10 and into shaping station 12. As a result, the furnace 10 and shaping station 12 must be sufficiently wide to accommodate this conveying and shaping arrangement.

With continued reference to FIGS. 1–3, the furnace 10 includes a horizontal conveyor with longitudinally spaced, transversely extending, cylindrical conveyor rolls 24 that define a path of travel which extends through the furnace 10. The conveyor rolls 24 may be of the type shown in U.S. Pat. No. 3,527,589 and may be arranged in sections with their rotational speed electronically adjusted in a manner well known in the art, so that the speed of each conveyor section may be controlled and synchronized.

As the heated sheets exit the furnace 10 and enter the shaping station 12, they are conveyed over a high speed run-out section of rolls 26 of a type well known in the art, which transfers the sheets into the shaping station 12, as will be discussed later in more detail. The shaping station 12 includes an upper vacuum shaping mold 14 and a lower shaping structure 28. If desired, the shaping station 12 may be enclosed and heated. Upper mold 14, which is preferably composed of a rigid material such as ceramic, cast iron, brass or steel, and covered with a heat resistant cover, such as stainless steel or fiber glass fabric, includes downwardly facing shaping surfaces 20A and 20B (collectively "surface 20"), each of which are shaped to conform to the desired configuration of one of the sheets to be shaped. In addition, the mold 14 may include a shaping surface cooling arrangement (not shown) to cool the shaped glass sheets G while it is held against the mold 14. This would be particularly useful in the shaping of glass sheets for windshields, wherein the sheets are subsequently annealed after shaping. Mold 14 further includes an evacuation pipe 30 connected through a suitable valve arrangement (not shown) to a vacuum source (not shown). The mold 14 may be provided with a pressurized air source which provides a positive pressure along surface 20 to help separate the heat softened glass sheets from the mold 14 when the vacuum is released. The valves for the vacuum and pressurized air lines may be synchronized according to a predetermined time cycle in any convenient manner well known in the glass sheet bending art. Mold 14 may be two separate sheet shaping units or a single unit with a vacuum arrangement to allow for independent control of each section of the mold as required. In addition, depending on the desired configuration of the glass sheets, the shaping surface 20 may be a single continuous surface. For example, if both glass sheets have a simple cylindrical curvature along their centerline and the sheets are aligned along the common centerline, the mold 14 may have a continuous uninterrupted surface 20 that will shape both glass sheets as shown in FIG. 1.

The upper vacuum mold 14 is horizontally movable via a shuttling arrangement 30, which may be similar to that disclosed in U.S. Pat. Nos. 4,662,925 and 4,767,434, or the like. More specifically, a motor drive (not shown) moves the mold 14 along guide rails 34 between shaping station 12 and transfer station 16, as indicated by arrow 36.

If desired, the rolls 24 in furnace 10 and/or the rolls 26 in shaping station 12 may be replaced with a gas hearth support arrangement of a type well known in the art.

Although not limiting in the present invention, in the embodiment illustrated in FIGS. 1–3, lower structure 28 includes a pair of shaping rings 38A and 38B (collectively "rings 38") to lift the heat softened glass sheets off the conveyor rolls 44 and press them against shaping surface 20 of upper mold 14. The rings 38 illustrated in FIGS. 1–3 are flexible shaping rings, each capable of assuming a flat shape when unstressed and a deformed shape that conforms to the curvature of the upper mold 14 during shaping of the sheets. The flexible rings 38 are supported on a common mounting plate 40 by compliant support assemblies 42 which allow each flexible ring 38 to engage and conform to a corresponding portion of shaping surface 20 of the upper vacuum mold 14, e.g. as disclosed in U.S. Pat. No. 4,830,650. It should be appreciated, however, that the lower structure 28 may alternatively include a pair of non-deformable rings each having a fixed shape corresponding to the final desired peripheral configuration of a corresponding glass sheet. Support rolls 44 are positioned within each ring 38 to support the heat softened glass sheets as they are delivered by rolls 26 into shaping station 12 and conveyed over rings 38. Rolls 44 are mounted independently from mounting plate 40 on frame 46 (shown in FIG. 3) so that vertical movement of the structure 28 does not affect the position of rolls 44. If desired, additional pressing pads (not shown) may be positioned within the periphery of rings 38A and 38B between rolls 44 to help lift center portions of the glass sheets G and press them against corresponding surface 20A and 20B, respectively, of the upper mold 14.

Although FIG. 1 illustrates rings 38 as having a continuous surface that contacts each sheet G about its entire periphery, it is contemplated that the rings 38 may be segmented and only contact and press selected portions of the glass sheets' periphery.

Mounting plate 40 is secured to an elevator means 48 so that the flexible rings 38 may be vertically reciprocated from an initial position, wherein the sheet engaging surface of each flexible ring 38 is positioned below support rolls 44 in shaping station 12, to a second position above the support rolls 44 to shape the glass sheets. As an alternative to moving rings 38 upward above the rolls 44 to transfer the glass sheets G onto rings 38, the rolls 44 may be lowered below rings 38 to effect the transfer. Rings 38 would then move upward and/or mold 14 would move downward to press the heat softened glass sheets G therebetween, as will be discussed later in more detail. It should be appreciated that each flexible ring 38 may be mounted on a separate support plate (not shown) that is actuated independently from the other. In this manner the vertical movement of rings 38A and 38B may be separately controlled to account for any conveying delays of the glass sheets from the furnace 10 into the shaping station 12.

Figure 4:
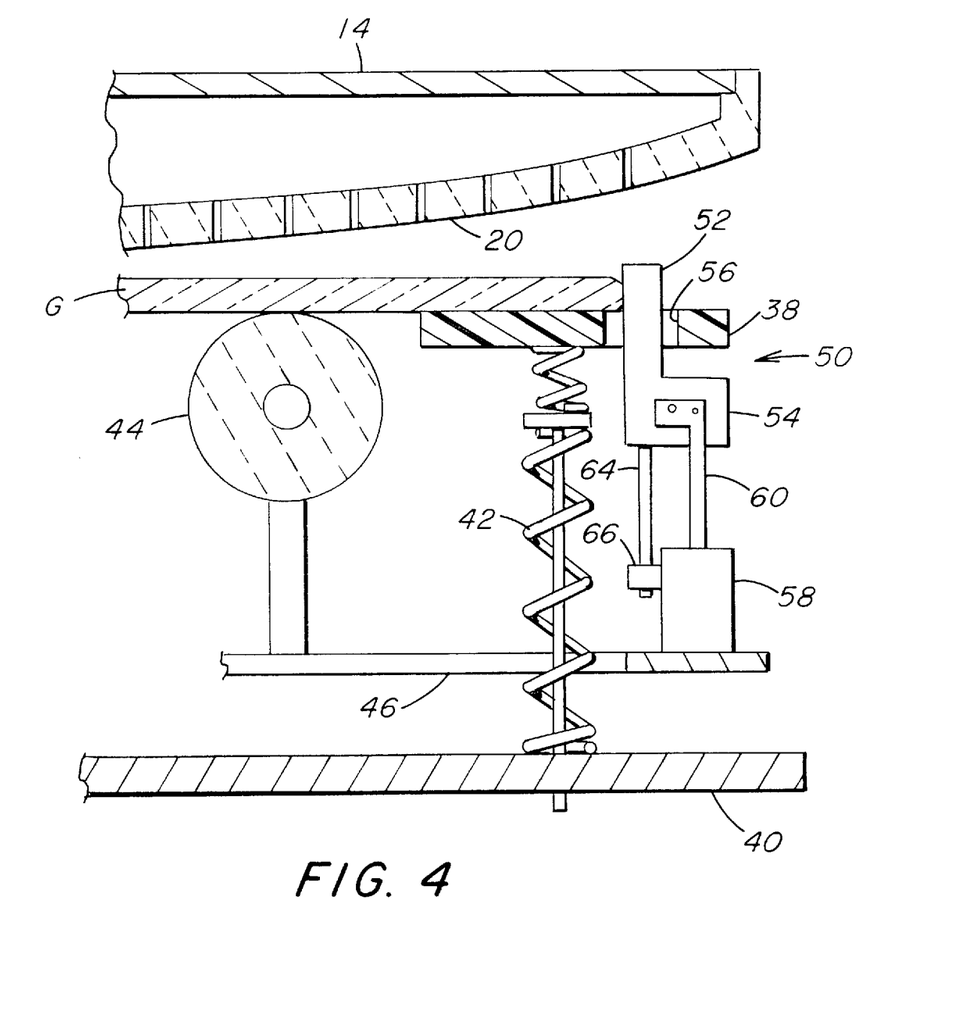
FIG. 4 is a sectional view taken along line 4—4 of FIG. 2, with portions removed for clarity.

In order to ensure proper positioning of both glass sheets G with the shaping station 12, sets of stops 50 are used. Although not required, it is preferred that each ring 38 incorporate two stops 50 to position each glass sheet. Although not limiting in the present invention, in the particular embodiment illustrated in FIG. 4, each stop 50 is positioned below one of the flex rings 38 and includes a post 52 which extends from base 54 upwardly through an opening 56 in the ring 38. Although not required, it is preferred that the stops 50 include an arrangement that provides for selectively moving the stops 50 between a first position, wherein posts 52 extend above the shaping surface of rings 38 so that the stops may contact a glass sheet being conveyed into the shaping station 12, and a second position, wherein posts 52 are positioned below the lower mold shaping surfaces so that the stops are spaced from and avoid contact with a glass sheet being conveyed into the shaping station 12, to allow the pairs of sheets to be conveyed into the shaping station 12 in different alignment configurations, as will be discussed later in more detail. To this end, base 54 of the stop 50 is secured to an actuator that vertically reciprocates the stops in any convenient fashion. In the particular embodiment of the stop 50 illustrated in FIG. 4, base 54 is bolted to the end of rod 60 of piston 58 which, in turn, is positioned a separate support, e.g. frame 46 as shown in FIG. 4, or on mounting plate 40, as will be discussed later in more detail. If desired, an alignment arrangement may be used to maintain the proper orientation of the post 52 as it extends through the ring 38. For example, in FIG. 4, the arrangement includes an alignment rod 64 which extends from base 54 and received by collars 66 which are fixed to piston 58. It should be appreciated that other stop configurations may be used to position the glass sheets within shaping station 12.

In one particular embodiment of the invention, stop 50 is constructed from 0.25 inch (0.635 cm) thick aramid board. Post 52 has a cross section of about 0.25 by 0.375 inches (0.635 by 0.953 cm) to provide the required rigidity and extends about 0.5 to 0.75 inches (1.27 to 1.91 cm) above ring 38. In addition to selectively moving the stops 50 from above to below the lower mold shaping surfaces, piston 58 may also be used to adjust the vertical position of stop 50 so that if the portion of post 52 that contacts the glass sheet G begins to wear, the stop 50 may be raised or lowered as required to present a different portion of post 52 to contact the glass sheet.

The transfer station 16 transfers the pairs of shaped glass sheets G on rolls 18 to the cooling station 22. The rolls 18 may be of any well known type, such as segmented rolls of the type shown in U.S. Pat. No. 4,311,509. In the particular embodiment of transfer station 16 illustrated in FIG. 1, the rolls 18 are aligned in an essentially horizontal orientation so that the vacuum mold 14 may shuttle the glass sheets via shuttle arrangement 32 to a position that is a short vertical distance above the horizontal path taken by the rolls 18. This linear arrangement of rolls 18 is preferably used when the glass sheets G are bent to a cylindrical shape, i.e. the sheets are bent along the single axis. When glass sheets G are bent to a compound shape that includes both a longitudinal and transverse axis of bending, it is preferred that each successive roll 18 be positioned along a longitudinally extending arcuate path which generally corresponds to the longitudinal bend of the sheets. The path provided by shaped rolls 18 extends through cooling station 22 to an unloading station (not shown). As an alternative to using curved rolls, the conveying surface within transfer station 16 may be a gas hearth or a belt conveyor as is known in the art.

Cooling station 22 includes a plurality of curved rolls 68, an upper plenum 70 which supplies cooling fluid under pressure in a downward direction through upper nozzle housings 72 and a lower plenum 74 which supplies cooling fluid under pressure upwardly through lower nozzle housings 76. Housings 72 and 76 have complementing curved opposing surfaces generally conforming to the transversely curved contour of shaped conveyor rolls 68 and are positioned between adjacent conveyor rolls 68 to cool the shaped glass sheets G at a rate sufficient to impart a desired degree of heat strengthening. As discussed earlier, the rolls 68 are positioned along a continuation of the conveyor path defined by rolls 18, i.e. preferably along a straight line for a cylindrical bend as shown in FIG. 3, or along a longitudinally extending arc for a compound bend. The rotational speed of the rolls 68 may be controlled so that the shaped glass sheets may be cooled quickly to impart at least a partial temper in the shaped glass sheet, or slowly, i.e. annealed, as is common practice in the fabrication of shaped glass sheets for windshields.

In operation, each pair of glass sheets, in turn, is conveyed through furnace 10 as indicated by arrow 78 and heated to their glass softening temperature while supported across their entire width on successive rolls 24. A sensor 80, which may be positioned within or at the exit end of the furnace 10, senses the position of the glass sheets, and in particular the leading or trailing edge or one or both of the sheets, and sends this information to a controller (not shown) which controls the conveying rates of rolls 24, rolls 26, and rolls 44. As the glass sheets G exit the furnace 10 and are conveyed to the shaping station 12, the flexible rings 38A and 38B are positioned below the upper conveying surface of the rolls 44 so that the glass sheets may be conveyed over the rings 38 without interference.

While it is possible to preset any desired program of rotational speeds for rolls 24, 26, and 44, in one particular embodiment, the program involves rotating conveyor rolls 24 within furnace 10 at a rate of rotation sufficient to transport the glass sheets through furnace 10 at a constant normal speed on the order of 400 to 450 inches (10.2 to 11.4 m) per minute. As each of the glass sheets G leave the furnace 10 and both sheets are fully supported by rolls 26, the rolls 26 accelerate in unison to increase the speed of the glass sheets G on the order of 2400 inches (61 m) per minute for transfer into the shaping station 12 and onto rolls 44, which are also rotated at a 2400 inches (61 m) per minute. The accelerated rolls 26 resume their normal speed after the glass sheets are transferred onto rolls 44 in shaping station 12.

Referring to FIG. 3, as the first glass sheet enters the shaping station 12, upstream stops 50A must be retracted to a position below the shaping surface of flexible ring 38A so that the first sheet may pass over flexible ring 38A and be positioned over flexible ring 38B and below mold surface 20B. Stops 50B are positioned to extend upward above the shaping surface of flexible ring 38B to contact the first glass sheet and ensure that it is oriented properly between flexible ring 38B and mold surface 20B within the shaping station 12. As soon as the trailing edge of this first sheet passes over stops 50A, stops 50A are raised to extend post 52 through opening 56 and above the shaping surface of flexible ring 38A to contact and properly orient the second glass sheet between flexible ring 38A and mold surface 20A.

When the glass sheets G are in proper position between shaping surfaces 20A and 20B of upper mold 14 and the corresponding flexible ring 38A and 38B, elevator means 48 moves lower structure 28 upward to simultaneously lift both the glass sheets off rolls 44. It should be noted that as each flexible ring 38 initially contacts the marginal edge portion of each glass sheet G, the ring 38 is essentially flat so that each ring simultaneously contacts the entire periphery of one of the glass sheets to be shaped. The lower structure 28 continues to move upward to press the marginal edge portion of each heat softened glass sheet G between the shaping surface 20 and flexible rings 38.

As discussed earlier, the stops 50 may be mounted on a support independent from the mounting plate 40, e.g. frame 46, so that as the lower structure 28 moves upward and rings 38 engage the glass sheets G, stops 50 maintain a spaced apart relationship relative to the mold 14. In this fashion, the post 52 slides out from opening 56 in each ring 38 as the ring lifts and presses the glass sheets against upper mold 14. As an alternative where the pistons 58 of the stops 50 are supported on mounting plate 40, as the lower structure 28 is moved upward to lift and shape the glass sheets, the pistons 68 must retract stops 50 so that posts 52 are not pushed against mold surface 20. As an alternative, posts 52 may be spring mounted in any manner well known in the art such that the posts 52 are pushed downward as the flexible rings 38 are pressed against corresponding portions of the upper mold 14.

If desired, prior to lifting the glass sheets G, the rolls 44 may be decelerated in unison to a glass sheet speed on the order of 600 inches (17.8 m) per minute or less at the moment the glass sheets contact the stops 50 to reduce the impact between the leading edge of the glass sheets and the posts 52 of stops 50. Furthermore, the rolls 44 may be stopped upon contact between the sheets and posts 52. After the glass sheets are lifted, the rotational speed of rolls 44 is increased until they are accelerated to the speed required to accept the next heat softened glass sheet from the furnace 10.

As the rings 38 engage the peripheral portions of the glass sheets and lifts them off rolls 44, the upper surface of each glass sheet initially contacts the lowest elevation of mold surfaces 20A and 20B. As the rings 38 continues to lift the glass sheets and press them against the mold 14, the area of glass sheet contact with the respective shaping surface 20 increases outward from the initial contact area and the rings 38 flex both rotationally and longitudinally and progressively deforms until the peripheral portion of each glass sheet G supported by ring 38A or 38B conforms to the corresponding surface 20A or 20B of the upper vacuum mold 14. Suction through vacuum mold 14 conforms the shape of the glass sheets throughout their extent to shaping surfaces 20.

After shaping, the lower structure 28 is lowered and the shaped glass sheets are held against the upper mold 14 by vacuum. Shuttle arrangement 32 is actuated to move upper vacuum mold 14 downstream as indicated by arrow 36 from shaping station 12 to transfer station 16. On arrival at position 82 in transfer station 16, the vacuum is discontinued to simultaneously release the shaped glass sheets and deposit them both directly onto the transversely curved conveyor rolls 18 which are rotating at the time of transfer with the shaped glass sheets being serially aligned on the conveyor rolls 18 along a common centerline of the glass sheets. Rotating conveyor rolls 18 remove the shaped glass sheets to the cooling station 22. Once unloaded, upper vacuum mold 14 stops its downstream motion and returns as rapidly as possible to the shaping station 12 to await the arrival of the next pair of glass sheets.

Although not limiting in the present invention, in a preferred embodiment, mold 14 attains a speed in transfer station 16 on the order of the peripheral speed of the transversely shaped conveyor rolls 18. The vacuum in mold 14 is then released while mold 14 is still moving within the transfer station 16 so that the glass sheets G are deposited on the rolls 18 at the roll conveying rate as the glass sheets G contact the rolls 18. This reduces the relative movement between the glass sheets G and the conveying surface of rolls 18 and reduces the potential for glass surface marking.

As an alternative to unloading sheet G from mold 14 while mold 14 is still moving, it is contemplated that mold 14 may be stopped and the sheets G deposited on rolls 18 which are temporarily stopped to receive the sheets G. Once deposited at the transfer station 18, the rolls 18 may be accelerated to convey the glass sheets G into the cooling station 22.

It is preferred to minimize the vertical distance that the shaped glass sheets G are raised from their plane of support on rolls 44 to shaping surface 20. Although not limiting in the present invention, it is preferred that the lowest portion of mold surface 20 be positioned a distance on the order of 0.25 inch (0.64 cm) above the upper surface of the glass sheets while supported on rolls 44. Also, at transfer station 16, conveyor rolls 18 are positioned a short vertical distance beneath mold 14 with the vertical spacing between the downwardly facing shaping surfaces 20A and 20B and the upper supporting surface of each transversely shaped conveyor rolls 18 being essentially uniform. This vertical distance through which each glass sheet G is transferred from shaping surface 20 to a shaped rolls 18 is preferably as small as possible and exceeds the glass sheet thickness by the minimum amount sufficient to insure clearance of the vacuum mold 14 and its vacuum supported glass sheet over conveyor rolls 18 when vacuum mold 14 and the glass sheets enter transfer station 16.

Although the present invention as illustrated in FIG. 1 positions the furnace 10, shaping station 12, transfer station 16 and cooling station 22 along a common centerline, it is contemplated that these glass sheet shaping components may be arranged in an "L" shaped alignment so that the shuttle arrangement 32 transfers the upper mold 14 and glass sheets G in a direction 90° relative to the centerline of the furnace 10 after shaping. More specifically, referring to FIGS. 5 and 6, the glass sheets G are conveyed through furnace 110 on rolls 124 in side-by-side orientation as indicated by arrow 178. Stops 150 are extended as the sheets are transferred via rolls 126 into the shaping station 112 to contact and align each glass sheet between shaping surfaces 120A and 120B of upper vacuum mold 114 and the corresponding flexible ring 138A and 138B on lower mold structure 128. When aligned, the lower mold structure 128 is raised and rings 138A and 138B engage and lift the glass sheets off rolls 144. Rings 138A and 138B then press the sheets against corresponding shaping surfaces 120A and 120B which are held thereagainst by vacuum. Structure 128 is then lowered and upper mold 114 shuttled to transfer station 116 as indicated by arrow 136 to position 182 where the sheets are deposited on rolls 118 and conveyed into cooling station 122 in a manner similar to that discussed earlier. This configuration provides the advantage of being able to remove defective glass from the shaping operation with little, if any, interruption in the overall glass processing. More specifically, in the event that one or both of the sheets to be shaped are defective, the appropriate stops 150 used to position the defective glass are lowered and the rotation of rolls 144 is maintained so that the defective sheet is conveyed through the shaping station 112 to a dump area (not shown) aligned immediately downstream from the shaping station 112, without first having to shape the sheet and pass it through the cooling station 122. The stops 150 then are extended to receive and align the next pair of glass sheets.

Figure 6:
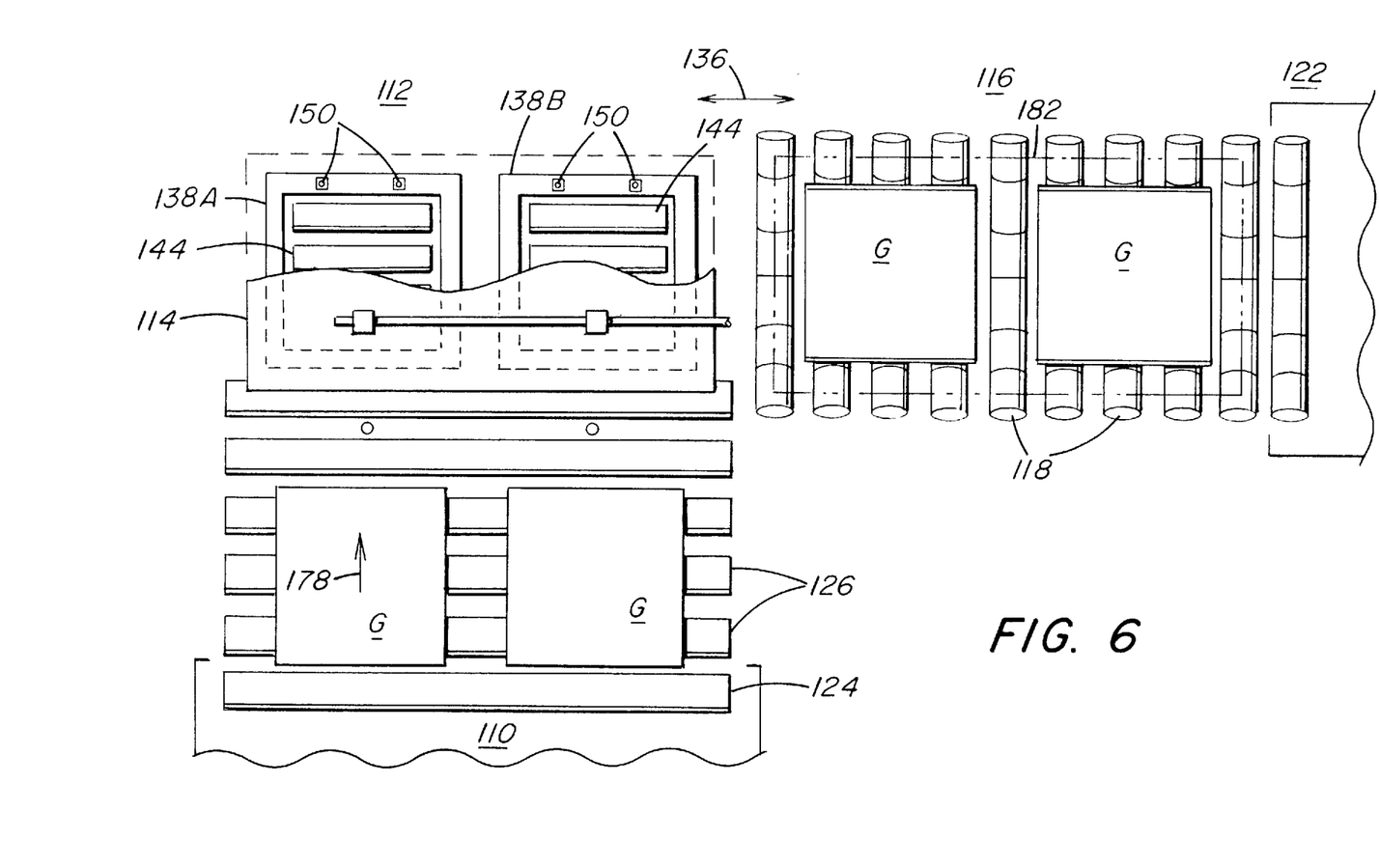
FIG. 6 is a schematic plan view of the embodiment of the invention illustrated in FIG. 5.

It is contemplated that the invention as illustrated in FIGS. 5 and 6 may be modified to provide for a shaping arrangement that delivers shaped sheets to transfer stations positioned on both sides of the shaping station. In particular, the upper mold would include two mold arrangements, each with two sheet shaping surfaces. The mold arrangements would be positioned relative to each other such that when the first mold arrangement has deposited the sheets at a first transfer station along one side of the shaping station, the second mold arrangement would be positioned within the shaping station awaiting the next set of glass sheets which will be aligned under the second mold by the stops. Similarly, when the second mold arrangement has deposited the sheets at the second transfer station along the opposing side of the shaping station, the first mold arrangement would be positioned within the shaping station awaiting the next set of glass sheets which will be aligned under the first mold by the stops. It should be further noted that the movement of the first and second mold arrangements may be independently controlled or the arrangements may be linked by a common drive system.

Glass sheet lifting and pressing arrangements other than those illustrated in FIGS. 1 and 3 may be used to lift and shape the glass sheets G prior to transferring them to the transfer station 16. For example, the lower mold may be a slotted mold as disclosed in U.S. Pat. No. 4,272,274 or an articulating ring as disclosed in U.S. Pat. No. 4,496,386. Furthermore, the lower mold may be eliminated by using air jets of the type disclosed in U.S. Pat. No. 4,204,854 to lift the glass sheet into contact with the upper mold. In addition, the sheet pressing operation may incorporate a shuttling lower mold and/or a flat vacuum pick-up as disclosed in U.S. Pat. No. 5,286,271.

The pressing arrangements illustrated in FIGS. 1 and 3 may also be used to form more than one glass sheet shape. In particular, the upper mold and lower rings may have a common, overlapping center region and different end regions as disclosed in U.S. Pat. No. 4,579,573.

It should be further appreciated that the present invention may be used to shape glass sheets in a convex upward configuration by using an upper female mold, i.e. a mold with a concave downward shaping surface and a lower male mold, i.e. a mold with a convex upper shaping surface. The molds may be full surface ring type molds as disclosed in U.S. Pat. Nos. 4,746,348 and 5,004,491. With such arrangements, the curvature of rolls 18 and 40 in the shaping station 12 and transfer station 16, respectively, must be adjusted to accommodate this type of shaped configuration.

The forms of the invention shown and described in this specification represent illustrative preferred embodiments and it is understood that various changes may be made without departing from the spirit of the invention as defined in the following claimed subject matter.

We claim:

1. An apparatus for shaping multiple sheets of heat softenable material, comprising:

a shaping station including an upper vacuum mold having a plurality of downwardly facing sheet shaping surfaces each generally conforming to a desired shape of a sheet to be shaped, and a plurality of stops positioned below said upper vacuum mold;

means to deliver a plurality of heat softened sheets to said shaping station and into contact with said stops, wherein said stops are positioned within said shaping station such that when said plurality of sheets are within said shaping station and each sheet of said plurality of sheets contacts a corresponding selected one of said stops, each sheet of said plurality of sheets is aligned below a corresponding one of said upper mold sheet shaping surfaces;

means to engage each sheet of said plurality of sheets with said corresponding one of said upper mold sheet shaping surfaces;

means to draw a vacuum along said upper mold sheet shaping surfaces to secure said plurality of sheets thereagainst and shape said plurality of sheets;

a transfer station including a conveying surface generally corresponding to said desired shape of said plurality of sheets;

means to move said upper vacuum mold and said plurality of sheets between said shaping station and said transfer station while said plurality of sheets are secured to said upper mold sheet shaping surfaces; and means to release said vacuum and deposit said plurality of sheets from said upper vacuum mold onto said conveying surface of said transfer station such that said plurality of sheets are serially aligned on said conveying surface along a common centerline of said plurality of sheets.

2. The apparatus as in claim 1 wherein said transfer station includes a set of conveyor rolls each having a transversely curved elevational contour to support and advance said plurality of sheets through said transfer station, said conveyor rolls forming said conveying surface.

3. The apparatus as in claim 2 wherein said releasing means includes means to deposit said plurality of sheets onto said conveyor rolls at said transfer station while said plurality of sheets are moving from said shaping station to said transfer station to impart movement in said plurality of sheets along said conveying surface as said plurality of sheets contact said conveyor rolls.

4. The apparatus as in claim 3 wherein said moving means includes means to move said upper vacuum mold and plurality of sheets to said transfer station at a speed which is generally the same as the speed at which said plurality of sheets advance along said conveyor rolls to minimize any change in said speed at which said plurality of sheets advance along said conveyor rolls when said plurality of sheets are deposited from said upper vacuum mold onto said conveyor rolls at said transfer station.

5. The apparatus as in claim 3 wherein said shaping station further includes a set of longitudinally spaced, transversely extending support rolls forming a sheet supporting surface and a plurality of lower molds, each vertically aligned below a corresponding one of said upper mold sheet shaping surfaces at a recessed position below said sheet supporting surface and having a lower mold sheet shaping surface generally complementing said corresponding one of said upper mold sheet shaping surfaces and further wherein said engaging means includes means to move each of said lower molds from said recessed position to a raised position above said sheet supporting surface to lift and press each sheet of said plurality of sheets against said corresponding one of said upper mold sheet shaping surfaces.

6. The apparatus as in claim 3 wherein said shaping station further includes a set of longitudinally spaced, transversely extending support rolls forming a sheet supporting surface and a plurality of lower ring molds, each vertically aligned below a corresponding one of said upper mold sheet shaping surfaces at a recessed position below said sheet supporting surface and further wherein said engaging means includes means to move each of said lower ring molds from said recessed position to a raised position above said sheet supporting surface such that each of said lower ring molds lifts and presses one of said plurality of sheets against said corresponding one of said upper mold sheet shaping surfaces, wherein each of said lower ring molds includes a flexible sheet shaping surface having a flat configuration when said lower ring mold initially engages a marginal edge portion of said one sheet of said plurality of sheets and lifts said one sheet of said plurality of sheets off said sheet supporting surface, and a shaped configuration when said lower ring mold presses said one sheet of said plurality of sheets against said corresponding one of said upper mold sheet shaping surfaces to conform said marginal edge portion of said one sheet of said plurality of sheets to selected portions of said corresponding one of said upper mold sheet shaping surfaces.

7. The apparatus as in claim 6 wherein said each of said upper mold sheet shaping surfaces has a different configuration.

8. The apparatus as in claim 7 further including means to selectively move said stops between a first position wherein said stops contact sheets delivered to said shaping station and a second position wherein said stops are spaced from and avoid contact with sheets delivered to said shaping station.

9. The apparatus as in claim 8 wherein said stops extend through said flexible sheet shaping surfaces of said lower ring molds when in said first position.

10. The apparatus as in claim 9 wherein said stops and said upper mold sheet shaping surfaces are maintained in spaced apart relation.

11. An apparatus for shaping multiple sheets of heat softenable material, comprising:

a shaping station including an upper vacuum mold having first and second downwardly facing sheet shaping surfaces, each generally conforming to a desired shape of a sheet to be shaped, and first and second sets of stops positioned below said upper vacuum mold;

means to deliver first and second heat softened sheets to said shaping station and into contact with said stops, wherein said stops are positioned within said shaping station such that said first sheet is aligned below said first sheet shaping surface when said first sheet contacts said first set of stops and said second sheet is aligned below said second sheet shaping surface when said second sheet contacts said second set of stops;

means to engage both said first sheet with said first sheet shaping surface and said second sheet with said second sheet shaping surface;

means to draw a vacuum along said first and second sheet shaping surfaces to secure both said first and second said sheets against said first and second sheet shaping surfaces, respectively, to shape said sheets;

a transfer station including a set of conveyor rolls each having a transversely curved elevational contour to support and advance said sheets through said transfer station, said conveyor rolls forming a conveying surface generally corresponding to said desired shape of said sheets to be shaped;

means to move said upper vacuum mold and said sheets between said shaping station and said transfer station while said first sheet is secured to said first sheet shaping surface and said second sheet is secured to said second sheet shaping surface; and means to release said vacuum and deposit both said sheets from said upper vacuum mold onto said conveying surface such that said sheets are serially aligned on said conveying surface along a common centerline of said sheets.

12. The apparatus as in claim 11 wherein said moving means includes means to move said upper vacuum mold and said sheets to said transfer station at a speed which is generally the same as the speed at which said sheets advance along said conveyor rolls and said releasing means includes means to deposit said sheets onto said conveyor rolls at said transfer station while said sheets are moving from said shaping station to said transfer station to impart movement in said sheets along said conveying surface as said sheets contact said conveyor rolls and minimize any change in said speed at which said sheets advance along said conveyor rolls when said sheets are deposited from said upper vacuum mold onto said conveyor rolls.

13. The apparatus as in claim 12 wherein said shaping station further includes a set of longitudinally spaced, transversely extending support rolls forming a sheet supporting surface, a first lower ring mold vertically aligned below said first sheet shaping surface at a first recessed position below said sheet supporting surface, and a second lower ring mold vertically aligned below said second sheet shaping surface at a second recessed position below said sheet supporting surface and said engaging means includes means to move said first and second lower ring molds from said recessed positions to raised positions above said sheet supporting surface to lift and press said first and second sheets against said first and second sheet shaping surfaces, respectively, wherein each of said lower ring molds includes a flexible sheet shaping surface having a flat configuration when said lower ring mold initially engages a marginal edge portion of a corresponding one of said sheets and lifts said one sheet off said sheet supporting surface, and a shaped configuration when said lower ring mold presses said one sheet against a corresponding one of said first and second sheet shaping surfaces to conform said marginal edge portion of said one sheet to selected portions of said corresponding one of said first and second sheet shaping surfaces.

14. The apparatus as in claim 13 further including means to selectively move said first and second sets of stops between a first position wherein said first set of stops contacts said first sheet delivered to said shaping station and said second set of stops contacts said second sheet delivered to said shaping station, and a second position wherein said first and second sets of stops are spaced from and avoid contact with said first and second sheets.

15. The apparatus as in claim 14 wherein said delivery means includes means to convey said first and second sheets in side-by-side relationship into said shaping station and into contact with said first and second sets of stops.

16. The apparatus as in claim 14 wherein said first position is a position above said sheet supporting surface and said second position is a position below said sheet supporting surface, said delivery means includes means to serially convey said first and second sheets into said shaping station in a direction generally aligned with said common centerline of said sheets, said selectively moving means includes means to lower said second set of stops to said second position and raise said first set of stops to said first position as said first sheet is conveyed into said shaping station such that said first sheet is conveyed below said first and second sheet shaping surfaces and contacts said first set of stops to align said first sheet below said first sheet shaping surface, and raise said second set of stops to said first position when said first sheet is conveyed beyond said second sheet shaping surface to contact said second sheet as said second sheet is conveyed into said shaping station and align said second sheet below said second sheet shaping surface, and said moving means further includes means to move said upper vacuum mold and said sheets in a direction generally aligned with said common centerline.

17. A method of shaping heat softenable sheet material comprising;

heating a plurality of sheets to be shaped to their heat softening temperature;

conveying said plurality of sheets into a shaping station having an upper vacuum mold with a plurality of downwardly facing sheet shaping surfaces, each of said sheet shaping surfaces generally corresponding to a desired shape of a sheet to be shaped;

contacting each sheet of said plurality of sheets within said shaping station with stops to align each sheet of said plurality of sheets below a corresponding one of said upper mold sheet shaping surfaces;

engaging each of said plurality of sheets with said corresponding one of said upper mold sheet shaping surfaces;

drawing a vacuum through said upper mold sheet shaping surfaces to conform each sheet of said plurality of sheets to said corresponding one of said upper mold sheet shaping surfaces and shape said plurality of sheets;

moving said mold and said plurality of sheets to a transfer station having a contoured conveying surface;

releasing said vacuum to deposit said plurality of sheets directly onto said contoured conveying surface of said transfer station along a centerline common to said plurality of sheets; and serially advancing said plurality of sheets over said contoured conveying surface along said centerline.

18. A method as in claim 17 wherein said releasing step is practiced during said moving step such that said plurality of sheets are advancing along said contoured conveying surface as they are deposited onto said contoured conveying surface.

19. The method as in claim 18 wherein said moving step includes the step of moving said vacuum mold from said shaping station to said transfer station at a speed which is generally the same as the speed at which said plurality of sheets move over said contoured conveying surface during said advancing step so as to minimize any change in said speed at which said plurality of sheets advance over said conveyor rolls when said vacuum is released and said plurality of sheets are deposited from said upper vacuum mold onto said contoured conveying surface.

20. The method as in claim 18 wherein said conveying step includes the step of conveying each sheet of said plurality of sheets along a generally horizontal path into said shaping station and said engaging step includes the step of raising lower molds from below said horizontal path to a position above said horizontal path to lift each sheet of said plurality of sheets and press each sheet of said plurality of sheets between a corresponding one of said lower molds and said corresponding one of said upper mold sheet shaping surfaces.

21. The method as in claim 18 wherein a first one of said upper mold sheet shaping surfaces has a surface configuration different from a second one of said upper mold sheet shaping surfaces such that said engaging and drawing steps produce sheets of different shaped configurations.

22. The method as in claim 18 further including the step of selectively moving said stops between a first position wherein said stops contact sheets conveyed into said shaping station and a second position wherein said stops are spaced from and avoid contact with sheets conveyed into said shaping station.

23. A method of shaping heat softenable sheet material comprising;

heating a first and second sheet to be shaped to their heat softening temperature;

conveying said first and second sheets to a shaping station having an upper vacuum mold with a first downwardly facing sheet shaping surface generally corresponding to a desired shape of said first sheet, and a second downwardly facing sheet shaping surface generally corresponding to a desired shape of said second sheet;

contacting said first sheet within said shaping station with a first set of stops such that said first sheet is aligned below said first sheet shaping surface when said first sheet contacts said first set of said stops;

contacting said second sheet within said shaping station with a second set of stops such that said second sheet is aligned below said second sheet shaping surface when said second sheet contacts said second set of said stops;

engaging said first sheet with said first sheet shaping surface and said second sheet with said second sheet shaping surface;

drawing a vacuum through said first and second sheet shaping surfaces to conform said first sheet to said first sheet shaping surface and second sheet to said second sheet shaping surface to shape said sheets;

moving said mold and said sheets to a transfer station having a contoured conveying surface;

releasing said vacuum to deposit said sheets directly onto said contoured conveying surface along a centerline common to said first and second sheets; and serially advancing said first and second sheets over said contoured conveying surface along said centerline.

24. The method as in claim 23 wherein said moving step includes the step of moving said upper vacuum mold from said shaping station to said transfer station at a speed which is generally the same as the speed at which said sheets move over said contoured conveying surface during said advancing step so as to minimize any change in said speed at which said sheets advance over said conveying surface when said vacuum is released and said sheets are deposited from said upper vacuum mold onto said contoured conveying surface.

25. The method as in claim 24 wherein said conveying step includes the step of conveying said sheets along a generally horizontal path into said shaping station and said engaging step includes the steps of raising a first lower ring mold vertically aligned below said first sheet shaping surface from below said horizontal path to a position above said horizontal path to lift and press said first sheet between said first lower ring mold and said first sheet shaping surface and raising a second lower ring mold vertically aligned below said second sheet shaping surface from below said horizontal path to a position above said horizontal path to lift and press said second sheet between said second lower ring mold and said second sheet shaping surface.

26. The method as in claim 25 further including the step of providing said first sheet shaping surface with a first surface configuration and said second sheet shaping surface with a second surface configuration different from said first surface configuration such that said engaging and drawing steps produce shaped sheets of different shaped configurations.

27. The method as in claim 25 further including the step of selectively moving said first and second sets of stops between a first position wherein said first and second sets of stops contact said corresponding first or second sheets conveyed into said shaping station and a second position wherein said first and second sets of stops are spaced from and avoid contact with said corresponding first or second sheet.

28. The method as in claim 25 wherein said conveying step conveys said first sheet below said second sheet shaping surface prior to conveying said first sheet below said first sheet shaping surface and further including the steps of moving said second set of stops below said horizontal path as said first sheet is conveyed into said shaping station and below said second sheet shaping surface and into contact with said first set of stops such that said first sheet is aligned below said first sheet shaping surface and moving said second set of stops above said horizontal path after said first sheet has passed below said second sheet shaping surface so as to contact said second sheet as said second sheet is conveyed into said shaping station such that said second sheet is aligned below said second sheet shaping surface.

* * * * *